United States Patent Office 3,663,555
Patented May 16, 1972

3,663,555
METHOD FOR PREPARING 3-HYDROXY-2-IMINO-1(2H) - PYRIDINE-SULFONIC ACID MONOHYDRATE
John Valdemar Brammer Petersen and Niels Clauson-Kaas, Farum, Denmark, assignors to Geigy Chemical Corporation, Ardsley, N.Y.
No Drawing. Application June 25, 1968, Ser. No. 751,650, now Patent No. 3,553,224, dated Jan. 5, 1971, which is a division of application Ser. No. 544,685, Apr. 25, 1966, now Patent No. 3,419,570, dated Dec. 31, 1968. Divided and this application Aug. 19, 1970, Ser. No. 65,337
Claims priority, application Switzerland, Apr. 29, 1965, 5,938/65, 5,939/65, 5,940/65
Int. Cl. C07d *31/48*
U.S. Cl. 260—294.8 R                    5 Claims

ABSTRACT OF THE DISCLOSURE 3-hydroxy-2-imino-1(2H)-pyridine-sulfonic acid monohydrate is prepared from furfural, a chlorinating agent and sulfaminic acid.

CROSS REFERENCE

This application is a division of our earlier copending application Ser. No. 751,650, filed June 25, 1968, now U.S. Pat. No. 3,553,224 dated Jan. 5, 1971 the latter being a division of our earlier application Ser. No. 544,685, filed Apr. 25, 1966, now U.S. Pat. No. 3,419,570 dated Dec. 31, 1968.

DETAILED DESCRIPTION

The present invention relates to a process for the production of the monohydrate of 3-hydroxy-2-imino-1(2H)-pyridine-sulfonic acid.

It has surprisingly been found that the monohydrate of 3 - hydroxy - 2 - imino - 1(2H)-pyridine-sulfonic acid, which compound has not been known up to the present, is obtained from easily accessible starting materials in satisfactory yield rates and substantially free from 3-hydroxy-2-oxo-1(2H)-pyridine derivatives from which it would be very difficult to separate, by the process according to the present invention, which consists essentially of (a) Reacting furfural in an aqeous medium, optionally with the addition of catalysts, with chlorine or a compound giving off chlorine, the molar ratio of the components being in the range of from 1:1 to 2:3;

(b) Reacting the resulting reaction mixture, the pH of which has preferably been adjusted to about 1 to 2 by the means described further below, with sulfaminic acid, and adjusting the pH of the reaction mixture to above 0.5 and below 6, and preferably to about 1 to 3, maintaining the pH of the reaction mixture by the addition of an alkaline agent either to one of the starting materials, or, immediately upon admixing the chlorine-treated furfural solution and the sulfaminic acid with each other, so that only for a few seconds the pH of the mixture is outside the above-defined range, and then, preferably, adding a sufficient amount of a strong mineral acid to adjust the pH value to within the preferred range between about 1 and 3; and (c) Isolating the precipitated 3 - hydroxy - 2-imino-1(2H)-pyridine-sulfonic acid monohydrate.

In order to facilitate providing the desired pH of the reaction mixture during the short interval mentioned above under (b), it is preferred to add a neutral aqueous solution of a water-soluble salt, e.g. an alkali metal or ammonium salt of sulfaminic acid, rather than the free acid, to the aqueous chlorinated furfural solution. It is thus possible to essentially reduce the formation of the undesirable 3-hydroxy-2-oxo-1(2H)-pyridine sulfonic acid as by-product, which would occur if the reaction medium immediately at admixture of the reactants would be too acid.

A small portion of this byproduct which precipitates in the form of the sodium salt together with the desired 3-hydroxy-2-imino-1(2H)-pyridine-sulfonic acid monohydrate, is eliminated by washing the latter with water in which the latter is considerably less soluble.

Water can be used as reaction medium for the chlorination and reaction with sulfaminic acid. When there are high concentrations of reaction components, it is recommended that a mixture of water and a water miscible solvent, or one which easily dissolves in water be used, such as, e.g. methanol, ethanol, propanol, isopropanol, tert.butanol, methoxyethanol, ethoxyethanol, n-butoxyethanol, dimethyl formamide, acetic acid or dioxan.

The chlorine can be added, e.g. in the gaseous state or as sodium hypochlorite. Examples of suitable catalysts for the reaction mixture such as sodium bromide or potassium iodide, also other inorganic compounds such as molybdenum salts, which experience has shown can increase the yields in oxidation with halogen. The chlorination is preferably performed at a pH under 6, and preferably below 2.

Sulfaminic acid, the amount of which should preferably be 1.0–3.0 mol calculated on the furfural, can be added as such, or in the form of one of its salts, such as sodium salt or the ammonium salt, to the aqueous furfural solution which has been treated with chlorine. The reaction is preferably performed in a weakly acid medium, e.g. in 0.001 N–0.3 N mineral acid solution.

The pH value desired in every phase of the sequence of reactions according to the invention, can be attained by the addition of compounds having a basic or acid reaction, provided it has not been adjusted already in a suitable manner by the reaction components and reaction products. Suitable basic compounds are, for example, hydroxides, carbonates or acetates of the alkali metals or of the ammonium ion. Suitable acid compounds are, for example, hydrochloric acid, sulfuric acid and acid sulfates, as well as organic acids such as, e.g. acetic acid.

The reaction of furfural and chlorine is performed below 40° and above the crystallization temperature of the reaction mixture, preferably, however, it is performed between −10° and 10°.

The reaction of sulfaminic acid and the furfural solution which has been treated with chlorine, is performed within a temperature range which is limited by the crystallization point of the reaction mixture and the boiling point thereof, it is preferably performed, however, between 0° and 20°.

The monohydrate of 3-hydroxy-2-imino-1(2H)-pyridine sulfonic acid is isolated simply by filtration.

The monohydrate of 3-hydroxy-2-imino-1(2H)-pyridine sulfonic acid according to the invention, is a reactive substance which is useful as an intermediate; e.g. it can easily be converted into 2-amino-3-pyridinol by storing it at room temperature or heating it, either per se or with water. The 2-amino-3-pyridinol can also be obtained from the reaction mixture containing the 3-hydroxy-2-imino-1(2H)-pyridine sulfonic acid without isolating the monohydrate, by storing this mixture at room temperature or heating it and then isolating the 2-amino-3-pyridinol formed.

Due to the present invention, 2-amino-3-pyridinol, which previously could only be obtained with difficulty, has become easily accessible so that it is now, also from an economic point of view, an excellent starting material for the production of valuable organic compounds. For instance, it is useful as a coupling component in the production of azo dyestuffs.

The following non-limitative examples will serve to further illustrate the nature of the present invention.

Example 1

(a) 71.0 g. of chlorine (=42.8 ml. measured at −80°, 1.00 mol) are introduced through a sintering glass tube at 0° while stirring well into a suspension of 96.1 g. (1.00 mol) of furfural in 700 ml. of water, the addition being made within 30 minutes. The furfural dissolves during the reaction and at the same time a slight amount (about 5 g.) of an oily substance separates and clings to the walls of the reaction vessel. 40% sodium hydroxide solution is then added dropwise at 0° until a pH of 2 is attained (about 200 g., 2.0 mol). The reaction mixture is decanted from the oily precipitate and diluted with water to 1000 ml. If the pale yellow solution cannot be worked up immediately, it is cooled to about −25°, at which temperature it can be stored for about 1 day without any noticeable change.

(b) A solution of sodium sulfamate is produced by dissolving 194 g. (2.00 mol) of sulfaminic acid in the mixture of 500 ml. of water and 200 g. of 40% sodium hydroxide solution. 1000 ml. of the reaction solution freshly prepared according to (a) are poured in at once at 10°. 50 ml. of 3 N hydrochloric acid are then added and the clear, pale yellowish solution is stirred at 10°. An almost white powder begins to precipitate after about 15 minutes. After 3 hours, the precipitate, the monohydrate of 3-hydroxy-2-imino-1(2H)-pyridine sulfonic acid, is filtered, and washed twice with 150 ml. of water each time. The moist filter residue, which weighs about 100–110 g., is refluxed for 5 minutes with 100 ml. of water and then cooled to room temperature. Another 50 ml. of water are added and the pH of the clear, brown solution is adjusted to pH 8 by the addition of 40% sodium hydroxide solution (about 65 g.). The mixture thickens into a crystal mass. This is continuously extracted with diethyl ether (in a 400 ml. Kutscher Steudel apparatus with magnetic stirrer and 250 ml. flask in which there are 150 ml. of diethyl ether). Filtration of the ethereal crystal suspension obtained yields 32.8 g. (30% of the theoretical) of 2-amino-3-pyridinol which melts at 172–174° (in evacuated tube, Hershberg. apparatus., corrected). In the region of the melting temperature, polymorphous changes appear to take place. The substance was identified spectroscopically (IR in KBr) by comparison with a sample produced by reduction of 2-nitro-3-pyridinol according to T. Takahashi and F. Yoneda, Pharm. Bull. (Tokyo) 5, 350 (1957).

Example 2

(a) 100 ml. of a reaction solution prepared according to Example 1a are added all at once to a solution of 19.4 g. (0.20 mol) of sulfaminic acid and 20 g. of 40% sodium hydroxide solution in 50 ml. of water and then 5 ml. of 3 N hydrochloric acid are added and the solution formed is stirred for 3 hours at 10°. The precipitate, the monohydrate of 3-hydroxy-2-imino-1(2H)-pyridine sulphonic acid, is filtered, washed twice with 15 ml. of water each time, twice with 10 ml. of methanol each time and finally with ether and it is then dried at room temperature under 1 mm. pressure. 6.45 g. (31% of the theoretical) of the above hydrate are obtained as fine, almost white crystals. The hydrate is almost insoluble in water and in organic solvents. Depending on type of heating it melts at 70–90°. At about 10–20° higher, the melt again becomes solid due to the formation of 2-amino-3-pyridinol sulfate which, in its turn, melts at 124–125°. The hydrate has a blue reaction to ferric chloride.

On working quickly and carefully the hydrate can be crystallised from water (1 g. to 50 ml. of water) in 85% yield. The crystallised product is white and gives one single spot in the thin layer chromatogram ("Kieselgel G" in methanol). After standing for 4 days at room temperature, according to the chromatogram the hydrate has partly changed into 2-amino-3-pyridinol and sulfuric acid, i.e. into the 2-amino-3-pyridinol monosulfate respectively.

To form the sodium salt, 3.40 g. (0.0163 mol) of the above hydrate are combined with 0.670 g. (0.0163 mol) of sodium hydroxide and 10 ml. of water to form an almost clear, pale yellowish solution. This is filtered dust-free and evaporated to dryness on a water bath at 100° under 15 mm. pressure. The sodium salt of 3-hydroxy-2-imino-1(2H)-pyridine sulfonic acid is obtained in a yield of 3.43 g. as a grey-white powder. It contains 3.5% of water; the yield therefore amounts to 96% of the theoretical. The substance is stable to refluxing for 20 minutes with 1 N sodium hydroxide solution. No precipitate is formed with barium chloride.

2,3-pyridinediol is obtained, when adding 40 ml. of concentrated hydrochloric acid to the mother liquor of the hydrate formed according to the first paragraph, refluxing the whole, cooling and buffering the pH to 4.5 with sodium hydroxide and finally continuously extracting with diethyl ether.

Example 3

58 ml. of sodium hypochlorite solution (containing 12.2 g. of active chlorine per 100 ml.) (0.10 mol) are added dropwise at 0° while stirring to a solution of 9.6 g. of furfural (0.10 mol) in 150 ml. of 1 N hydrochloric acid, the addition being made within 10 minutes. After standing for 5 minutes, 7 ml. of 40% sodium hydroxide solution and then 22 g. of ammonium sulphamate (0.19 mol) are added. The temperature is brought to 10° and the pH is adjusted to 1.7 with a little sodium hydroxide solution. After 3 hours, the precipitated 3-hydroxy-2-imino-1(2H)-pyridine sulphonic acid monohydrate is filtered and washed and dried as described in Example 2. The yield is 6.1 g. (29% of the theoretical).

Example 4

86 g. of chlorine (1.21 mol) are introduced at 0° while stirring vigorously into a solution of 10 ml. of furfural, 10 g. of sodium bromide and 3 ml. of concentrated hydrochloric acid in 300 ml. of water. The pH of the reaction mixture is kept at 1 by the addition of 40% sodium hydroxide solution, and simultaneously 1 ml. of furfural is added for each milliliter of sodium hydroxide solution until a total of 100 ml. of furfural (116 g., 1.21 mol) have been added. On completion of the introduction of chlorine, a solution of 200 g. of sulfaminic acid (2.03 mol) in 200 ml. of water and 120 ml. of 40% sodium hydroxide solution is added. The temperature is brought to 10° and the pH adjusted to 1.0 by the addition of concentrated hydrochloric acid. After 2 hours, the precipitate formed which consists of a mixture of sodium 3-hydroxy-2-oxo-1(2H)-pyridine-sulfonate and the monohydrate of 3-hydroxy-2-imino-1(2H)-pyridine-sulfonic acid, is filtered and refluxed for 15 minutes with 350 ml. of water. The resultant acid solution, the pH of which is about 0.5, is cooled and then continuously extracted for 12 hours with diethyl ether. 5 g. (4% of the theoretical) of 2,3-pyridinediol crystallizes from the diethyl ether. It melts at 246–253° (in evacuated tube).

After the extraction with diethyl ether, the acid solution is adjusted to pH 8 by the addition of solid sodium hydroxide and again extracted for 12 hours with diethyl ether. 34 g. (26% of the theoretical) of 2-amino-3-pyridinol crystallize from the diethyl ether.

Example 5

15 g. of chlorine (0.21 mol) are introduced at 0° into a solution of 19 g. of furfural (0.20 mol) and 5 g. of potassium bromide in 100 ml. of water and 25 ml. of acetic acid, the introduction being made within 30 minutes while stirring vigorously. The pH is kept at 1 by the addition of potassium acetate. After 10 minutes, 45 g. of ammonium sulfamate (0.40 mol) are added to the reaction mixture and dissolved by stirring at 10°. The pH of the solution is adjusted to 1.70 by the addition of concentrated hydrochloric acid and the mixture is stirred for 2 hours at 10°. The precipitate formed, the monohydrate of 3-hydroxy-2-imino-1(2H)-pyridine sulfonic acid, is filtered, washed with 60 ml. of water and converted into 2-amino-3-pyridinol as described in Example 1 by boiling with water. The yield is 9.2 g. (41% of the theoretical).

What is claimed is:

1. A process for producing the monohydrate of 3-hydroxy-2-imino-1(2H)-pyridine sulfonic acid, which consists essentially of
    (1) reacting with each other in an aqueous medium
        (a) furfural, and
        (b) a chlorinating agent selected from among chlorine and an agent releasing chlorine in aqueous medium, the molar ratio of (a) to (b) ranging from about 1:1 to 2:3, at a pH below 6;
    (2) adding to the resulting reaction mixture a solution of sulfaminic acid;
    (3) adding to the aqueous medium at any time, but not later than immediately after the addition of sulfaminic acid, a sufficient amount of an alkaline agent to adjust the pH of the final mixture to between 0.5 and 6, and
    (4) recovering the resulting 3-hydroxy-2-imino-1(2H)-pyridine sulfonic acid monohydrate from the reaction mixture.

2. A process as defined in claim 1, wherein steps (2) and (3) are carried out by adding a substantially neutral aqueous solution of water-soluble sulfaminate to the reaction mixture resulting from step (1).

3. A process as defined in claim 1, further which consists essentially of adding to the aqueous mixture, after step (3), sufficient acidifying agent to adjust the pH of said mixture to the range between about 1 and 3.

4. A process as defined in claim 2, wherein the water-soluble sulfaminate is sodium sulfaminate.

5. A process as defined in claim 2, wherein the water-soluble sulfaminate is ammonium sulfaminate.

References Cited

Grammaticakis, Chem. Abstracts, vol. 54, 8810g–8812c, May 10, 1960.

ALAN L. ROTMAN, Primary Examiner